(12) United States Patent
Ericson (10) Patent No.: US 6,666,376 B1
(45) Date of Patent: Dec. 23, 2003

(54) CALENDAR

(75) Inventor: Petter Ericson, Malmö (SE)

(73) Assignee: Anoto AB, Lund (SE)

( * ) Notice: Subject to any disclaimer, the term of this patent is extended or adjusted under 35 U.S.C. 154(b) by 0 days.

(21) Appl. No.: 09/580,337

(22) Filed: May 26, 2000

Related U.S. Application Data (60) Provisional application No. 60/138,401, filed on Jun. 9, 1999.

(30) Foreign Application Priority Data

May 28, 1999 (SE) ................................................ 9901955

(51) Int. Cl.[7] ................................................ G06K 7/10
(52) U.S. Cl. ......................... 235/454; 235/380; 235/375
(58) Field of Search ................................ 235/380, 375, 235/454, 494

(56) References Cited

U.S. PATENT DOCUMENTS

| | | |
|---|---|---|
| 5,128,528 A | 7/1992 | Heninger |
| 5,477,012 A | 12/1995 | Sekendur |
| 5,652,412 A | 7/1997 | Lazzouni et al. |
| 5,661,506 A | 8/1997 | Lazzouni et al. |
| 5,932,863 A | 8/1999 | Rathus et al. |
| 6,081,261 A | 6/2000 | Wolff et al. |

FOREIGN PATENT DOCUMENTS

| | | |
|---|---|---|
| EP | 0276109 A2 | 7/1988 |
| EP | 0362970 A2 | 4/1990 |

OTHER PUBLICATIONS

Intelligent Paper, Marc Dymetman et al., Xerox Research Centre Europe, France, No date.

*Primary Examiner*—Karl D. Frech
(74) *Attorney, Agent, or Firm*—Birch, Stewart, Kolasch & Birch, LLP.

(57) ABSTRACT

A calendar comprises a plurality of pages and a plurality of calendar areas, each of which identifies a unique time period and is adapted to receive handwritten entries for that time period. The calendar areas are provided with a code which makes it possible to create an electronic back-up of a handwritten entry which is made in the calendar area.

An arrangement for electronic storage of the entry which is made in the physical calendar is adapted to record the handwritten entry electronically and to determine the unique time period with which the entry is associated so that the entry can be stored in the correct position in a digital calendar.

37 Claims, 6 Drawing Sheets

CALENDAR

CROSS REFERENCE TO RELATED APPLICATION

This application claims the benefit of U.S. Provisional Application No. 60/138,401, filed Jun. 9, 1999.

FIELD OF THE INVENTION

The present invention relates to a physical calendar, comprising a plurality of pages, which have a plurality of calendar areas, each of which identifies a unique time period and is adapted to receive a handwritten entry for that time period. The invention also relates to an arrangement for recording calendar information, a method and a calendar page.

BACKGROUND OF THE INVENTION

Today, many people use calendars as a memory aid to help them keep track of appointments and various types of tasks that must be carried out at set times, both at home and at work. There are many different types of calendars which can essentially be divided into two main groups: paper-based and electronic.

Paper-based calendars, where the user writes with an ordinary pen in predefined writing areas, are still the most common group. They are usually very reliable and easy to use, but have the drawback that all information written in them is lost if the user should happen to lose the calendar.

In addition to a paper-based calendar, many people use an electronic calendar in their computer at work. Electronic calendars have the advantage that they can usually carry out alarm functions to remind the user about meetings and other activities. However, most people sometimes forget to record the information in their computer as well as in their paper-based calendar.

Fairly recently, several types of portable electronic calendars, so-called PDAs, have come on the market. These are intended to replace the paper-based calendars and have the advantage that they can automatically exchange the calendar information with a computer so that the calendar information the user has in his computer and in his portable calendar is always identical. However, many people still prefer to use paper-based calendars.

SUMMARY OF THE INVENTION

It is thus an object of the present invention to obviate the above-mentioned problems of paper-based calendars.

A further object of the invention is to increase the functionality of paper-based calendars.

This object is achieved completely or partly by a calendar according to claim 1, an arrangement for recording calendar information according to claim 13, a method for digital storage of calendar information according to claim 22, and a calendar page according to claim 24. Preferred embodiments are defined in the subclaims.

More specifically, the invention relates to a physical calendar, comprising a plurality of pages, which have a plurality of calendar areas, each of which identifies a unique time period and is adapted to receive a handwritten entry for that time period, each calendar area being provided with an electronically readable code, which is designed for creating an electronic back-up of the handwritten entry made in the calendar area.

In a calendar according to the invention, all entries in the physical calendar can also be recorded electronically without any additional action on the part of the user. This means that the user can have the advantages of both the electronic and the physical calendar.

In this connection, the term "physical calendar" thus refers to a calendar belonging to the paper-based group described in the introduction and having pages made of paper or a similar material which is suitable for receiving handwritten entries made with an ordinary pen.

The calendar areas can be of various shapes, such as boxes or rows of various sizes and can identify different time periods such as months, weeks, days or a specific time on a certain day. In these calendar areas, a user can fill in activities which relate to the respective time period. Each calendar page can have zero, one, or several calendar areas identifying a unique time period.

Each of the above-mentioned calendar areas is thus provided with an electronically readable code, i.e. a code which can be read by means of an electronic aid. The purpose of the code is to enable an electronic back-up of the handwritten entry that the user makes in the calendar area in question. For this purpose, the code may enable the determination of the time period to which the entry relates and/or the digitization of the entry.

It should be noted that a time period should be interpreted broadly. It can be defined by one point in time with respect to its beginning and one point in time with respect to its end, or only a single point in time with respect to both its beginning and its end, or in some other suitable way. As it is used here, the term time period also includes a single point in time.

Preferably the code extends across essentially the entire calendar areas. In this way, the code can be read regardless of where a handwritten entry is made in the areas. The code can advantageously be a position code which indicates a position in the calendar, for example with one or more coordinates. Preferably, the position code codes a plurality of positions in each calendar area. The reason for this is that continuous reading of the position of a pen when a handwritten entry is being made is one way of digitizing the handwritten entry. Furthermore, the position can be translated into a time period. Moreover, the position code is advantageously unique for each calendar area so that a simple reading of the position code will enable the determination of the time period identified by the calendar area. Suitably, the position code can be two-dimensional, so that it codes positions in two dimensions. In this case, it is preferably formed in such a way that one dimension of the position code is unique for each calendar area, making it possible to use this dimension for determining the time period. If the position code is not unique for each time period, some other means must be used for determining the time period. In that case, each of the calendar areas can advantageously also comprise a time code enabling the determination of the time period identified by the calendar area. Alternatively, each of the calendar areas can comprise such a time code only, making it necessary to record the handwritten entry in electronic form in some other way than by using the position code. In this case, one way is to image the handwritten entry electronically or to determine how the pen creating the handwritten entry is being moved, for example with the aid of images or accelerometers. However, it is, of course, advantageous if the same code can be used for both the time determination and the digitization of the entry, not least because this makes it possible for the reading device to use the same sensor for both tasks.

The code can be chemical, magnetic, or of some other type, but preferably it is optically readable, which means that it must be capable of reflecting/absorbing light in such manner that the code can be recorded with a light sensitive sensor. The calendar areas can identify time periods of different length. In this way, all the pages of the calendar need not look the same. For example, one page may correspond to one year, in which case each calendar area may correspond to a month. Another page may correspond to one day, in which case each calendar area corresponds to one hour.

In a preferred embodiment of the calendar, however, the code is a first absolute position-coding pattern which extends across the calendar areas and codes coordinates for absolute positions so that a handwritten entry which is made in a first of said calendar areas can be recorded digitally in the form of a coordinate sequence by detecting the first absolute position-coding pattern and the time period which is identified by the first calendar area can be determined on the basis of the coordinates in the coordinate sequence.

By the absolute position-coding pattern coding absolute positions, all positions which can be detected by means of the absolute position-coding pattern in the calendar areas will be unique. As a result, all the positions within a certain calendar area can be associated with the time period identified by that calendar area, and in this way entries that are made in this calendar area can be related to the associated time period. The absolute position-coding pattern must code positions with such a resolution that handwritten entries can be recorded by means of the pattern with sufficient accuracy.

The absolute position-coding pattern thus has the double function of enabling digital recording of a handwritten entry which is generated as a user moves a pen across the pattern, and defining the unique time period to which the handwritten entry is related.

The first absolute position-coding pattern can advantageously constitute a first subset of a larger absolute position-coding pattern, which first subset codes coordinates for points within a first coordinate area on an imaginary surface, which comprises all points which the larger absolute position-coding pattern is capable of coding, said first coordinate area being dedicated to calendar information.

In this case, the first absolute position-coding pattern thus does not in the first place code absolute positions in the calendar areas, but within an area, dedicated to calendar information, on the imaginary surface. Thus the calendar does not necessarily have coordinates which begin in the origin of coordinates. The advantage of this is that different units, which handle calendar information in the form of coordinates and which besides handle other information recorded by means of other subsets of the absolute position-coding pattern and, thus, also consisting of coordinates, can distinguish the calendar information from the other information and, consequently, distinguish the processing of the different types of information.

The calendar can advantageously have at least one page which is provided with said first absolute position-coding pattern and indications specifying said unique time periods, in which case the first absolute position-coding pattern and said indications are superimposed on each other. The indications can be, for example, alpha-numerical indications which specify the time periods or be limiting markings which distinguish different time periods. Such indications are to be found in normal physical calendars. Here, however, they superimpose or are superimposed by the absolute position-coding pattern. This means that the page contains two information layers—one that can be read with the user's naked eye and one that can be read electronically. A handwritten entry can constitute a third information layer.

The absolute position-coding pattern absorbs advantageously IR light and can, to this end, be printed with carbon-based black printing ink. If the indications and the handwritten entries are made with the aid of some other type of ink that does not absorb IR, they will not prevent the detection of the absolute position-coding pattern.

In the calendar, advantageously at least one calendar area can be associated with a function field which defines a function or a command that is to be performed with regard to a handwritten entry which is made in this calendar area. When a handwritten entry has been recorded electronically, a user can by means of the function field define how the entry is to be processed. If the entry is recorded electronically with a portable user unit, the user may want to store the entry in his digital calendar in his personal computer. He can then, by using the function field, instruct the user unit that the entry is to be transferred to the personal computer or some other external unit with which the user unit can communicate. As an alternative, recorded entries can be transferred directly to the digital calendar as soon as the user unit gets in contact with the unit containing the digital calendar.

The function field can be provided with a second absolute position-coding pattern. The recording of the command then proceeds in the same way as the recording of the handwritten entry, except that the user unit identifies the coordinates which are coded by the second absolute position-coding pattern as defining the command. Moreover, it is essentially sufficient that the coordinates for one point are detected by means of the second absolute position-coding pattern.

The second absolute position-coding pattern is advantageously a second subset of the larger virtual absolute position-coding pattern, which second subset codes coordinates for points in a second coordinate area on the imaginary surface which is dedicated to the command. In this manner, the same second subset of the absolute position-coding pattern can be used to code the command in a number of positions in the calendar.

Alternatively, each function field relating to one and the same command can be represented by different coordinates and especially by the coordinates for its position in the calendar.

The calendar further advantageously comprises at least one writing area that does not define a time period and that is adapted to receive handwritten entries, said writing area being provided with a third absolute position-coding pattern.

Many physical calendars comprise special pages or areas for address information, non-time-related entries, "to-do" lists and the like. Each of these areas can be provided with an absolute position-coding pattern which enables electronic recording of handwritten entries that are made in these areas.

The third absolute position-coding pattern can be a third subset of the larger virtual absolute position-coding pattern, which third subset codes coordinates for points within a third area on the imaginary surface. This area can be, for example, dedicated to address book information or data for a "to-do" list or the like so that recorded entries can be identified as intended for storage in, for example, a digital address book or task list.

Also the writing area can be associated with a function field which defines a function or a command that is to be carried out with respect to a handwritten entry that has been made in the writing area. The function field can be designed in the same way as described above.

The command can be, for example, one of storing the handwritten entry, sending a mail containing the handwritten entry, sending an SMS containing the handwritten entry and sending a fax containing the handwritten entry. The writing area can thus be used to send information which is entered in the writing area. This increases the functionality of the paper-based calendar so that it corresponds to that of a modern PDA.

The position code of the calendar is preferably based on a first string of symbols, which contains a first predetermined number of symbols and which has the characteristic that if a second predetermined number of symbols are taken from the first string of symbols, the location of these symbols in the first string of symbols is unambiguously determined, the first string of symbols being used for determining the position in a first dimension on the calendar page; and on a second string of symbols having the same characteristic as the first string of symbols, the second string of symbols being used to determine the position in a second dimension on the calendar page.

Since the position code is based on a string of symbols with a finite number of symbols arranged in a predetermined order, it is possible to define a "formula" for determining the position in a first dimension on the surface. In this way, only a small amount of memory space is required for storing the string of symbols and the position determination can be carried out quickly and easily. The position can, for example, be indicated as a pair of coordinates in a Cartesian or a polar coordinate system.

According to a second aspect of the invention, it relates to an arrangement for electronically storing a handwritten entry which is made in a physical calendar comprising a plurality of pages, which have a plurality of calendar areas, each of which identifies a unique time period and is adapted to receive the handwritten entry, said arrangement being adapted to record the handwritten entry electronically essentially at the same time as it is being made in a first of said calendar areas and to determine the unique time period which identifies the first calendar area, thereby enabling the creation of an electronic back-up of the calendar.

The advantages of this arrangement are evident from that stated above.

According to a third aspect of the invention, it relates to a method for processing calendar information, comprising the steps of electronically recording a handwritten entry that is made in a calendar area in a physical calendar, the recording being made in the form of a coordinate sequence; determining a unique time period to which the calendar area corresponds on the basis of coordinates in said coordinate sequence, and storing the electronically recorded handwritten entry in a digital calendar in connection with a time indication corresponding to the unique time period.

The advantages of this method are evident from that stated above.

According to a fourth aspect of the invention, it relates to a calendar page which is provided with an absolute position-coding pattern which enables electronic recording of a handwritten entry that is made on the calendar page.

The advantages of this aspect of the invention are evident from that stated above. What has been said above regarding the calendar also relates in applicable parts to the calendar page, the method and the arrangement.

BRIEF DESCRIPTION OF THE DRAWINGS

Preferred embodiments of the present invention will be described in more detail below with reference to the accompanying drawings.

DESCRIPTION OF PREFERRED EMBODIMENTS

Figure 1:
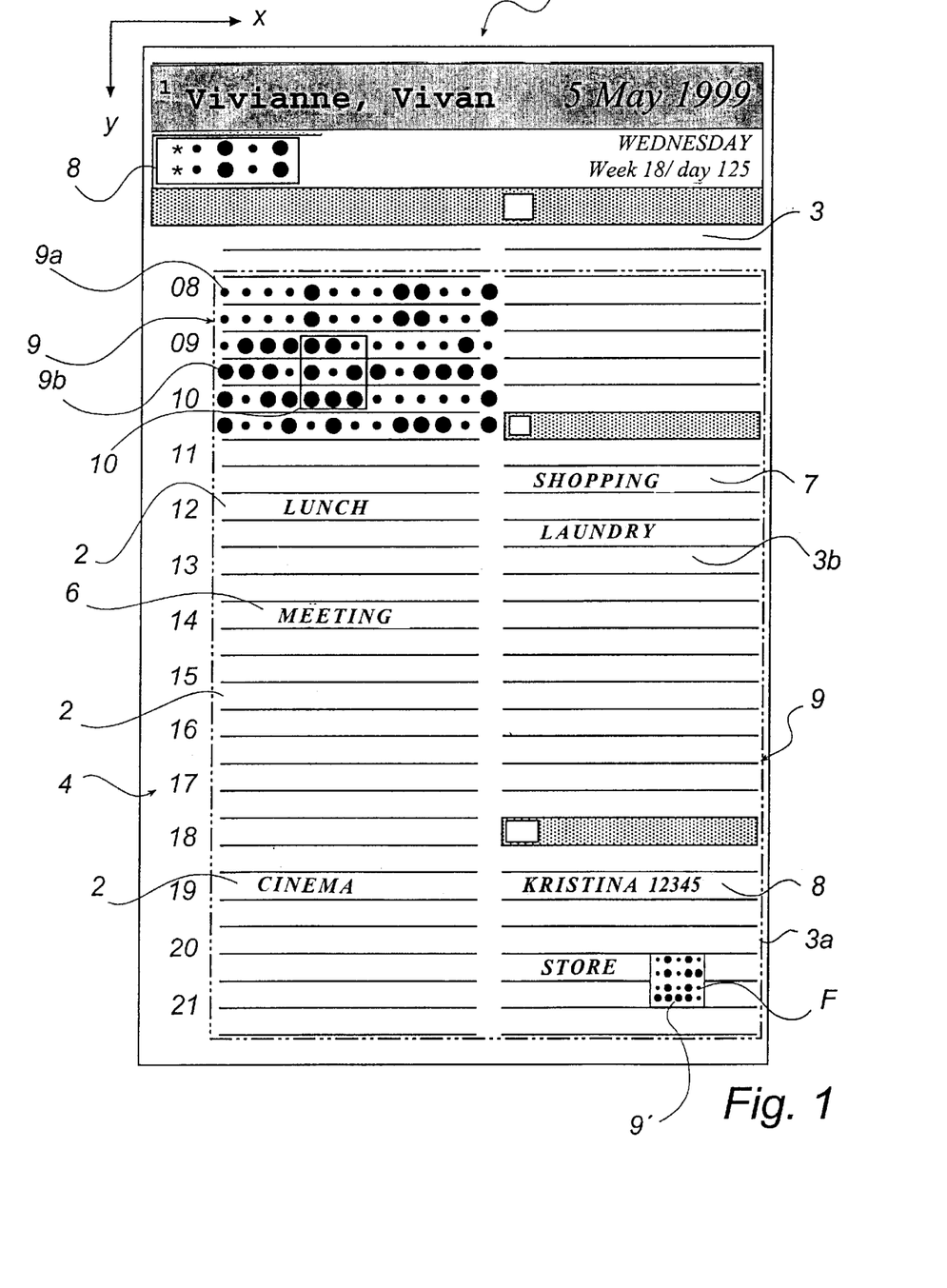
FIG. 1 shows a page in a calendar according to the present invention which is provided with an absolute position-coding pattern and which comprises a plurality of calendar areas and a plurality of writing areas.

The following is a description of an embodiment of the invention in which the used code consists of an optically readable absolute position-coding pattern which codes coordinates for absolute positions. FIG. 1 shows a page 1 from a calendar. The calendar page is divided into a number of calendar areas 2 which each define a unique time period, and a number of writing areas 3 relating to some type of list, such as a "to-do" list 3*a* and a task list 3*b*. On the calendar page 1 shown in FIG. 1, each calendar area 2 identifies or corresponds to a time period which is one hour in length and which starts with an hour indication 4, but in other embodiments it can correspond to shorter or longer time periods. In some of the areas, appointments 6, activities 7 or telephone numbers 8 have been entered.

The calendar page 1 is provided with an absolute position-coding pattern 9 which enables position determination. This absolute position-coding pattern 9 (hereinafter also called the position-coding pattern) is made up of symbols of a first and a second type 9*a*, 9*b* and more specifically of dots of different sizes, a small dot 9*a* representing a one and a large dot 9*b* representing a zero. For the sake of clarity, the pattern 9 is only shown on a small part of the calendar page and the symbols have been much enlarged. The absolute position-coding pattern shown in FIG. 1 will be described in detail below. It constitutes a first variant of patterns that can be used in a calendar according to the invention.

Each position that is coded by the position-coding pattern in the calendar areas is unique. More specifically the position-coding pattern codes absolute coordinates for points or positions on an imaginary surface. This surface is a conceived surface that is made up by or consists of all the points which an absolute position-coding pattern has the capacity of coding, thus not only the positions that are to be found in the calendar. On the imaginary surface, defined different coordinate areas are dedicated to different purposes. One coordinate area is dedicated to calendar information. The subset of the absolute position-coding pattern that is used in the calendar areas in the calendar codes coordinates for points in the area dedicated to calendar information.

On the imaginary surface, other coordinate areas can be dedicated to other purposes. It may have, for example, a coordinate area which is dedicated to information from writing areas of the type which in FIG. 1 is designated 3a–3b and which is intended for non-time-related information.

Figure 2:
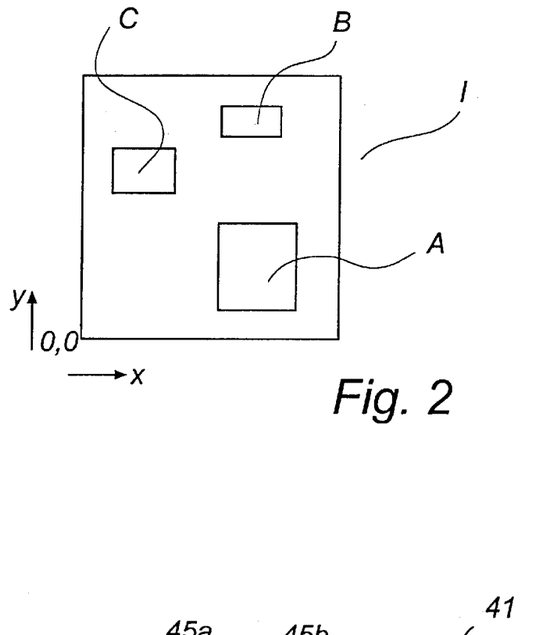
FIG. 2 is a schematic view of an imaginary surface which is made up by all the absolute points whose coordinates an absolute position-coding pattern has the capacity of coding.

FIG. 2 illustrates most schematically the imaginary surface I which is made up by the absolute position-coding pattern in its entirety. The surface has a first coordinate area A which is dedicated to calendar information, a second coordinate area B which is dedicated to non-time-related entries and a third coordinate area C which is dedicated to a specific function. Preferably, use is made of the subset of the absolute position-coding pattern which corresponds to the coordinate area A for the calendar areas and the subset which corresponds to the coordinate area B for the writing areas 3a–3b. On the page in FIG. 1, the absolute position-coding pattern will in this case code coordinates for points of which not all are positioned side by side on the imaginary surface. If the written data should not be related to an indication of time, the same subset of the pattern can, if desired, be used in the writing areas on several pages.

As an alternative to the above, the entire calendar can be "laid out" in a continuous area on the imaginary surface so that each position in the entire calendar is unique. However, this makes the detection of how information from different parts of the calendar is to be processed difficult.

On the calendar page in FIG. 1, there is also a function field F which defines the command "store". This function field can be provided with a special subset 9' of the absolute position-coding pattern, which subset codes coordinates for points within an area on an imaginary surface which is dedicated to the function or the command store, for example the area C in FIG. 2.

The position-coding pattern 9 is arranged so that if a device images the symbols 9a, 9b on a partial surface 10 on the calendar page, the position of this partial surface 10 on the calendar page 1 can be determined automatically by a processor in the device. If the connection between position and time period is unambiguous and predetermined, the time period can be determined from the position.

Below follows a description of a first example of a position-coding pattern enabling the position determination on the calendar page in FIG. 1. The pattern is adapted for position determination by the imaging of a partial surface containing 5×5 symbols. The symbols represent a binary coding.

The page has an x-direction and a y-direction. In order to code the position in the x-direction, a 32-bit number series of ones and zeros is generated in a first step. In a second step, a 31-bit number series of ones and zeros is generated by removing the final bit of the 32-bit series. Both number series, hereinafter called the x-number series; should have the characteristic that if five successive numbers are selected anywhere in the series a unique group of five bits is obtained which does not exist anywhere else in the series. They should also have this characteristic if one "connects" the end of the series to the beginning of the series. The five-bit group thus provides an unambiguous coding of the location in the series.

An example of a 32-bit number series having the above characteristic is "00001000110010100111010110111110". If the last zero is removed from this number series, a 31-bit number series having the same characteristic is obtained.

The first five bits in the above number series, i.e. 00001, constitute the code for position 0 in the number series, the next five bits, i.e. 00010, constitute the code for position 1, etc. The positions in the x-number series as a function of the five-bit groups are stored in a first table. Naturally, position 31 only exists in the 32-bit series. Table 1 below shows the position coding for the example described above.

TABLE 1

| Position | Five-bit Group |
|---|---|
| 0 | 00001 |
| 1 | 00010 |
| 2 | 00100 |
| 3 | 01000 |
| 4 | 10001 |
| 5 | 00011 |
| 6 | 00110 |
| 7 | 01100 |
| 8 | 11001 |
| 9 | 10010 |
| 10 | 00101 |
| 11 | 01010 |
| 12 | 10100 |
| 13 | 01001 |
| 14 | 10011 |
| 15 | 00111 |
| 16 | 01110 |
| 17 | 11101 |
| 18 | 11010 |
| 19 | 10101 |
| 20 | 01011 |
| 21 | 10110 |
| 22 | 01101 |
| 23 | 11011 |
| 24 | 10111 |
| 25 | 01111 |
| 26 | 11111 |
| 27 | 11110 |
| 28 | 11100 |
| 29 | 11000 |
| 30 | 10000 |
| 31 | 00000 |

It is only possible to code 32 positions, i.e. positions 0–31, with the aid of the 32-bit series. However, if one writes the 31-bit series 32 times in succession on a first row and the 32-bit series 31 times in succession on a second row below the first row, the series will be displaced in relation to each other in such a way that two five-bit groups written one above the other can be used to code 31×32=992 positions in the direction of the rows.

For example, suppose that the following code is written on the calendar page:

000 . . . 11111000001000110010100111010110111110 . . .

000 . . . 11111000010001100101001110101101111100 . . .

If the five-bit groups are translated into positions according to Table 1, the following positions of the 32- and 31-bit series are indicated on the calendar page.

| 0 | 1 | 2 | ...30 | 31 | 0 | 1 | 2...29 | 30 | 31 | 0 | 1 | 2 |
| 0 | 1 | 2 | ...30 | 0 | 1 | 2 | 3...30 | 0 | 1 | 2 | 3 | 4 |

The coding in the X-direction is thus based on using a number series consisting of n bits which is made up in such a way that if m successive numbers are taken from the series, these m numbers will code the position in the series unambiguously. The number of codable positions is increased by using a second number series, which is a subset of the first number series and which is thus of a different length than the first series. In this way, a displacement between the series is obtained in the longitudinal direction of the rows.

The coding in the Y-direction is based on the same principle. A number series is created, hereinafter called the Y-number series, which consists of p numbers, the series being made up in such a way that if r successive numbers are taken from the series, these r numbers will code the position in the series and thus the position in the Y-direction unambiguously. The numbers in the Y-number series are coded in the pattern on the calendar page as a difference between the positions in the X-direction in two rows, which is calculated in a special way.

More specifically, alternate rows of the 31-bit series and the 32-bit series are written as follows:

Row 1: (31) (31) (31) (31) . . .

Row 2: (32) (32) (32) (32) . . .

Row 3: (31) (31) (31) (31) . . .

Row 4: (32) (32) (32) (32) . . .

Row 5: (31) (31) (31) (31) . . .

Naturally, on the calendar page, the series are written using the different symbols. The rows start in different positions in the X-number series. More specifically, one begins two successive rows in such a way that if one determines the difference modulo 32 between two position numbers located one above the other, expresses the difference by means of a five-bit binary number, and takes the two most significant bits of said five-bit binary number, this number shall be the same regardless of where one is in the row. In other words, one starts the series in such a way that the displacements between the series in two successive rows remain within a specific interval along the entire row. In this example, the maximum displacement can be 31 positions or bits and the minimum displacement can be 0 positions or 0 bits. The displacements along each pair of rows are then within one of the intervals 0–7, 8–15, 16–23, or 24–31 positions/bits.

For example, suppose that the series are written as follows (expressed in position numbers):

| Row 1: | 0 | 1 | 2 | 3 | 4 | 5 | 6 | 7 . . . 30 | 0 | 1 | 3 | 2 |
| Row 2: | 0 | 1 | 2 | 3 | 4 | 5 | 6 | 7 . . . 30 | 31 | 0 | 1 | 2 |
| Row 3: | 25 | 26 | 27 | 28 | 29 | 30 | 0 | 1 . . . 24 | 25 | 26 | 27 | 28 |
| Row 4: | 17 | 18 | 19 | 20 | 21 | 22 | 23 | 24 . . . 16 | 17 | 18 | 19 | 20 |
| Row 5: | 24 | 25 | 26 | 27 | 28 | 29 | 30 | 0 . . . 23 | 24 | 25 | 26 | 27 |

If the difference is determined in the above way, it will be 0 between rows 1 and 2, 0 between rows 2 and 3, 1 between rows 3 and 4, and 3 between rows 4 and 5. Take, for example, 26-18 in rows 3 and 4, which equals 8, which is 01000 in binary code. The two most significant numbers are 01. If instead one takes 0–23 in the same rows, which modulo 32 equals 9, the two most significant numbers are 01 just like in the previous example. In this example, four difference numbers 0,0,1,3 are obtained. Now, if in same way as for the X-direction, one has created a Y-number series from the numbers 0, 1, 2 and 3 which has the characteristic that if four successive numbers are taken from the series, the position in the series will be determined unambiguously, it is possible by looking up the number 0013 in a table to unambiguously determine the position in the Y-direction. In this way, it is possible to determine 256 unique positions in the Y-direction.

The following is an example of the beginning and the end of a Y-number series containing the numbers 0–3:

TABLE 2

| 0 | 0000 |
| 1 | 0001 |
| 2 | 0010 |
| 3 | 0100 |
| 4 | 1000 |
| 5 | 0002 |
| 6 | 0020 |
| 7 | 0200 |
| 8 | 2000 |
| 9 | 0003 |
| 10 | 0030 |
| . | . |
| . | . |
| 251 | 2333 |
| 252 | 3333 |
| 253 | 3330 |
| 254 | 3300 |
| 255 | 3000 |

The following is a description of how the position determination is carried out. Suppose that one has a calendar page as described above with a first writing surface which is provided with a pattern made up of a first symbol representing a 1 and a second symbol representing a 0. The symbols are arranged in rows and columns and in 32-bit and 31-bit series as described above. Furthermore, suppose that one wishes to determine the position in the writing area where one places a device equipped with a sensor which can record an image containing 5×5 symbols.

Suppose that an image recorded by the optical sensor looks as follows:

1 1 1 1 1

1 1 1 1 1

0 1 0 1 0

0 0 1 0 1

0 0 0 1 1

In a first step, the device translates these five-bit to positions with the aid of Table 1. The following positions are obtained:

26 (11111)

26 (11111)

11 (01010)

10 (00101)

05 (00011)

Subsequently, the magnitude of the displacement between the position numbers in the different rows is determined by taking the difference modulo 32. The two most significant numbers of the differences determined in this manner expressed as five-bit binary numbers are 0, 1, 0, 0. According to Table 2, this difference number equals position 3 in the Y-direction. Thus, the coordinate for the second dimension on the calendar page is 3.

A third table stores the starting position of each row, i.e. the position in the numbers series where each row starts. In this case, with the aid of the y-coordinate 3 it is possible to look up the starting positions of the rows from which the recorded five-bit groups have been taken. Knowing the starting positions of the rows from which the two uppermost five-bit groups have been taken and the X-positions to which these two five-bit groups correspond, i.e. positions 26 and 26, it is possible to determine the x-coordinate, or the position in the first dimension, of the recorded image. For example, suppose that the starting positions of the two uppermost rows are 21 and 20 respectively. In this case, the two rows from which the two uppermost five-bit groups in the recorded image are taken will thus look as follows:

Row 3: 21 22 23 . . . 29 30 31 0 1 2 . . . 25 26 27 . . .
Row 4: 20 21 22 . . . 28 29 30 0 1 2 . . . 25 26 27 . . .

It follows from the fact that the y-coordinate is 3 that the two first five-bit groups are taken from rows 3 and 4. It follows from the fact that odd rows are made up of the 31-bit number series and even rows are made up of the 32-bit number series that row 3 is made up of a 32-bit number series while row 4 is made up of a 31-bit number series.

On the basis of this information, it is possible to determine that the x-coordinate is 35. This can be verified by repeating the above steps for the remaining pairs of five-bit groups in the recorded image. There is thus a certain amount of error tolerance.

The accuracy of the position determination can be further increased by determining the location of the middle dot in the 5×5 group in relation to the center of the image. The position resolution can thus be better than the distance between two symbols.

Naturally, the above steps are carried out by software, which in this example gives the coordinates 3 and 35 as its output signal.

The above description relates to an example and can thus be generalized. There need not be 32 numbers in the first X-number series. The number depends on how many different symbols are to be used in the pattern in combination with the number of symbols which are recorded in the X-direction in connection with the position determination. For example, if the number of different symbols is 3 and the number of recorded symbols is 3, the maximum number of numbers in the X-number series will be 3×3×3=27 instead of 32. The same type of reasoning applies to the Y-number series. The bases of these number series can thus be different and the number of symbols which code a position, and consequently also the number of positions coded by the number series, can vary. Moreover, the series can be based on symbols other than numbers and can therefore be described as strings of symbols.

As mentioned above, the symbols can be of many different kinds. They can also be numbers, but in that case OCR software is required for carrying out the position determination, which makes the device for position determination more expensive and more complicated. It also leads to increased error sensitivity.

The above method of coding positions on a calendar page and of carrying out the position termination on the same is advantageous in that it only requires a very small amount of memory and processor capacity. In the above example, it is only necessary to store Table 1 with 32 rows, Table 2 with 256 rows, and Table 3 with 256 rows. The position determination can be carried out by means of three table look-ups and a simple calculation. Subsequently, only a fourth look-up is required in a table where the time period to which the coordinates correspond is stored.

Preferably, the position-coding pattern is arranged in the calendar in such a way that all positions coded by the pattern are unique. In that case, the position determines the time period in the calendar unambiguously.

The above position-coding pattern can code positions on a surface having a certain extent in the X-direction and a certain extent in the Y-direction. One could use a strip of this position-coding pattern with a considerably longer extent in the X-direction than in the Y-direction for the coding in the calendar, the X-coordinates being unique for each first writing area, while the Y-coordinates are the same. The x-coordinates can then be translated into time, while the combination of X- and Y-coordinates is used for position determination in digitizing the handwritten entry. By using different "strips" in the position-coding pattern, i.e. different intervals for the Y-coordinate, for calendars for different years, it becomes possible to code the year in the Y-dimension.

In yet another variant, "squares" can be used diagonally in the position-coding pattern, so that each first writing area will have unique Y-coordinates as well as unique X-coordinates. In this case, the time period identified by the writing area can be determined with the aid of both the X-coordinates and the Y-coordinates, a redundancy, and thus a less error sensitive system, being obtained. In this case, different "diagonals" can be used for different years.

Alternatively, the same pattern can be used in several places in the calendar, which means that the ambiguity must be solved. This can be done by applying a special time code 8, for example at the top of each page. The time code can, for example, be composed of a special symbol followed by a binary indication of a time period coded using the same symbols as in the position code. In this case, in order to be able to make an entry manually with an electronic back-up, the user must read the time code before making the manual entry.

Different calendars can be marked with a special code so that the user can record a change of calendar.

As is evident from the above, the position code is used to identify the time period to which the entry relates. However, it is also used for creating an electronic recording of the handwritten entry made in the calendar by continuously recording the position of the pen while the entry is being made. Together, these positions form a description or an image of how the pen has been moved. This image or description can then be stored in an electronic calendar in the device and/or in an external unit.

Figure 3:
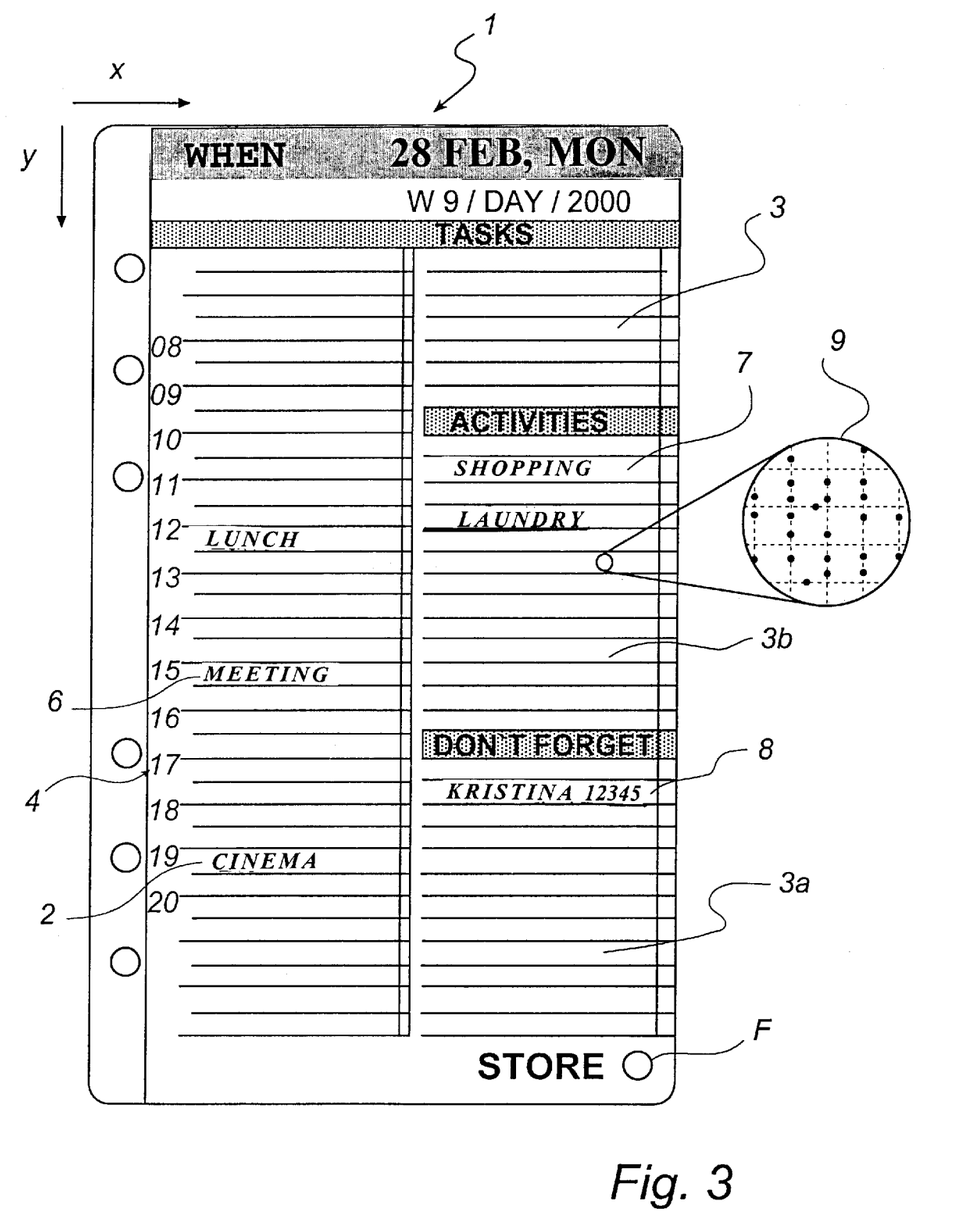
FIG. 3 shows a second example of a page in a calendar.

FIG. 3 shows an example of a second calendar page. The same reference numerals as in FIG. 1 are used to designate equivalent parts. On the calendar page in FIG. 3, the absolute position-coding pattern is shown as it is seen with the user's naked eye in a realistic embodiment of the calendar page. It is merely to be seen as a faint gray hue on the page. In an enlarged portion of the pattern, however, it is indicated how the absolute position-coding pattern is made up in this case.

To allow the absolute position-coding pattern to be used to record information with high resolution and also to be used in a calendar application which requires unique position coding across a large surface, the absolute position-coding pattern must be designed so as to be able to code the coordinates for a very large number of points with high resolution. Furthermore, the absolute position-coding pattern should be coded graphically in such a manner that it does not spoil the surface to which it is applied. Finally, it must be easy to detect so that the coordinates can be determined with great reliability.

An absolute position-coding pattern that satisfies the above-mentioned requirements is described in Applicant's Swedish Patent Application 9903541-2 that was filed on Oct. 1, 1999.

This absolute position-coding pattern is composed of extremely small dots which in a realistic embodiment can have a nominal space of 0.3 mm. Any part of the pattern which contains 6×6 such dots defines the absolute coordinates for a point on the imaginary surface. Each point on the imaginary surface is thus defined by a 1.8 mm×1.8 mm subset of the absolute position-coding pattern. By determining the position of the 6×6 dots on a sensor in a digital pen which is used to read the pattern, a position can be determined on the imaginary surface with a resolution of 0.03 mm. The imaginary surface is made up by all the points whose absolute coordinates can be coded by the pattern. Since each point is coded with 6×6 dots which can each assume one of four values, $2^{72}$ points can be coded, which with the above-mentioned nominal space between the dots corresponds to a surface of 4.6 million km$^2$. An advantage of this absolute position-coding pattern is that, owing to its size, it can be used for many different parallel applications. Thus, a digital pen which is used for electronic recording of handwritten entries in a calendar can also be used for recording other handwritten entries that are to be processed in some other way and the processing of which is controlled by the specific absolute coordinates representing the entries.

The above absolute position-coding pattern can be printed on any type of paper or other material that enables a resolution of about 1000 dpi. The sheet of paper can have any size and shape whatever depending on the intended application. The pattern can be printed using standard offset printing technique. A common black carbon-based printing ink or some other printing ink that absorbs IR light can advantageously be used. This means in fact that other inks, including black ink which is not carbon-based, can be used to superimpose another print on the absolute position-coding pattern without interfering with the reading thereof.

A surface provided with the above-mentioned pattern printed with a carbon-based black printing ink will be experienced by the human eye as merely a faint gray hue on the surface (1–3% blacking), which is user-friendly and esthetically attractive in a calendar.

Of course, a smaller or larger number of dots than described above can be used to define a point on the imaginary surface and larger or smaller gaps between the dots can be used in the pattern. The examples are just stated to illustrate a presently preferred accomplishment of the pattern.

In the following the preferred absolute position-coding pattern will be described in more detail.

Figure 4:
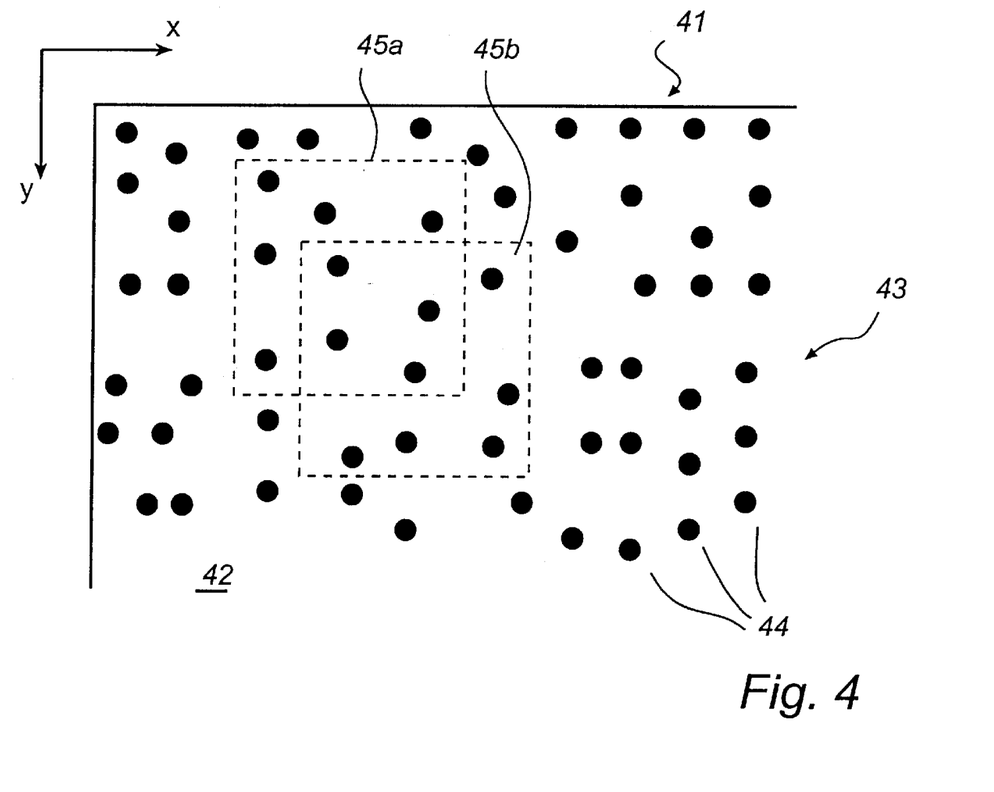
FIG. 4 shows schematically a sheet of paper which is provided with an absolute position-coding pattern.
Figure 5:
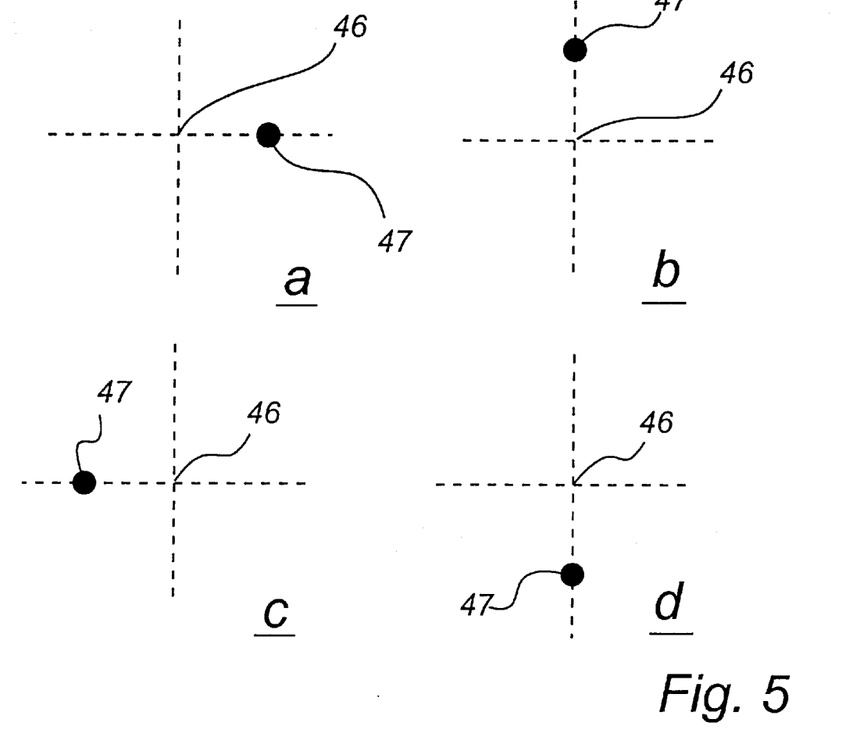
FIG. 5 shows schematically how symbols can be designed according to the absolute position-coding pattern in FIG. 4.

FIG. 4 shows a part of a product in the form of a sheet of paper 41, which on its surface 42 is provided with an optically readable absolute position-coding pattern 43 (in the following just referred to as position-coding pattern) enabling position determination, more specifically determination of absolute coordinates for points on the imaginary surface. The position-coding pattern consists of symbols 44 which are systematically arranged across the surface 42, so as to make its appearance "patterned". Depending on the size of the symbols, the patterning can, as is evident from that stated above, be perceived as a gray hue. The sheet has an x-coordinate axis and a y-coordinate axis.

The position-coding pattern comprises a virtual raster, which thus neither is visible to the human eye nor can be detected directly by a device which is to determine positions on the surface, and a plurality of symbols 44, which each are capable of assuming one of four values "1"–"4" as will be described below. It should here be emphasized that, for the sake of clarity, the position-coding pattern in FIG. 4 has been enlarged to a considerable extent. Moreover, the position-coding pattern is shown only on part of the sheet.

The position-coding pattern is arranged in such manner that absolute coordinates for a point on the imaginary surface are coded by the symbols on a partial surface of the sheet, and thus by the position-coding pattern, having a predetermined size. A first and a second partial surface 45a, 45b are indicated by dashed lines in FIG. 4. That part of the position-coding pattern (in this case 3×3 symbols) which is to be found on the first partial surface 45a codes the coordinates for a first point, and that part of the position-coding pattern which is to be found on the second partial surface 45b codes the coordinates for a second point on the imaginary surface. Thus the position-coding pattern is partially shared by the adjoining first and second points. Such a position-coding pattern is in this application referred to as "floating".

FIGS. 5a–d show an embodiment of a symbol which can be used in the position-coding pattern. The symbol comprises a virtual raster point 46 which is represented by the intersection between the raster lines, and a marking 47 which has the form of a dot. The value of the symbol depends on where the marking is located. In the example in FIG. 5, there are four possible positions, one on each of the raster lines extending from the raster points. The displacement from the raster point is equal to all values. In the following, the symbol in FIG. 5a has the value 1, in FIG. 5b the value 2, in FIG. 5c the value 3 and in FIG. 5d the value 4. Expressed in other words, there are four different types of symbols.

Each symbol can thus represent four values "1–4". This means that the position-coding pattern can be divided into a first position code for the x-coordinate, and a second position code for the y-coordinate. The division is effected as follows:

| Symbol value | x-code | y-code |
| --- | --- | --- |
| 1 | 1 | 1 |
| 2 | 0 | 1 |
| 3 | 1 | 0 |
| 4 | 0 | 0 |

Thus, the value of each symbol is translated into a first digit, in this case bit, for the x-code and a second digit, in this case bit, for the y-code. In this manner, two completely independent bit patterns are obtained. The patterns can be combined to a common pattern, which is coded graphically by means of a plurality of symbols according to FIG. 5.

The coordinates for each point are coded by means of a plurality of symbols. In this example, use is made of 4×4 symbols to code a position in two dimensions, i.e. an x-coordinate and a y-coordinate.

The position code is made up by means of a number series of ones and zeros which have the characteristic that no sequence of four bits appears more than once in the series. The number series is cyclic, which means that the characteristic also applies when one connects the end of the series to the beginning of the series. Thus a four-bit sequence always has an unambiguously determined position in the number series.

The series can maximally be 16 bits long if it is to have the above-described characteristic for sequences of four bits. In this example, use is, however, made of a series having a length of seven bits only as follows:

"0 0 0 1 0 1 0".

This series contains seven unique sequences of four bits which code a position in the series as follows:

| Position in the series | Sequence |
|---|---|
| 0 | 0001 |
| 1 | 0010 |
| 2 | 0101 |
| 3 | 1010 |
| 4 | 0100 |
| 5 | 1000 |
| 6 | 0000 |

For coding the x-coordinate, the number series is written sequentially in columns across the entire surface that is to be coded. The coding is based on the difference or position displacement between numbers in adjoining columns. The size of the difference is determined by the position (i.e. with which sequence) in the number series, in which one lets the column begin. More specifically, if one takes the difference modulo seven between on the one hand a number which is coded by a four-bit sequence in a first column and which thus can have the value (position) 0–6, and, on the other hand, a corresponding number (i.e. the sequence on the same "level") in an adjoining column, the result will be the same independently of where along the two columns one makes the comparison. By means of the difference between two columns, it is thus possible to code an x-coordinate which is constant for all y-coordinates.

Since each position on the surface is coded with 4×4 symbols in this example, three differences (having the value 0–6) as stated above are available to code the x-coordinate. Then the coding is carried out in such manner that of the three differences, one will always have the value 1 or 2 and the other two will have values in the range 3–6. Consequently no differences are allowed to be zero in the x-code. In other words, the x-code is structured so that the differences will be as follows: (3–6) (3–6) (1–2) (3–6) (3–6) (1–2) (3–6) (3–6) (1–2) . . . Each x-coordinate thus is coded with two numbers between 3 and 6 and a subsequent number which is 1 or 2. If three is subtracted from the high numbers and one from the low, a number in mixed base will be obtained, which directly yields a position in the x-direction, from which the x-coordinate can then be determined directly, as shown in the example below.

By means of the above described principle, it is thus possible to code x-coordinates 0,1,2 . . . , with the aid of numbers representing three differences. These differences are coded with a bit pattern which is based on the number series above. The bit pattern can finally be coded graphically by means of the symbols in FIG. 5.

In many cases, when reading 4×4 symbols, it will not be possible to produce a complete number which codes the x-coordinate, but parts of two numbers. Since the least significant part of the numbers is always 1 or 2, a complete number, however, can easily be reconstructed.

The y-coordinates are coded according to the same principle as used for the x-coordinates. The cyclic number series is repeatedly written in horizontal rows across the surface which is to be position-coded. Just like in the case of the x-coordinates, the rows are allowed to begin in different positions, i.e. with different sequences, in the number series. However, for y-coordinates one does not use differences but codes the coordinates with numbers that are based on the starting position of the number series on each row. When the x-coordinate for 4×4 symbols has been determined, it is in fact possible to determine the starting positions in number series for the rows that are included in the y-code in the 4×4 symbols. In the y-code the most significant digit is determined by letting this be the only one that has a value in a specific range. In this example, one lets one row of four begin in the position 0-1 in the number series to indicate that this row relates to the least significant digit in a y-coordinate, and the other three begin in the position 2–6. In y-direction, there is thus a series of numbers as follows: (2–6) (2–6) (2–6) (0–1) (2–6) (2–6) (2–6) (0–1) (2–6) Each y-coordinate thus is coded with three numbers between 2 and 6 and a subsequent number between 0 and 1.

If 1 is subtracted from the low number and 2 from the high, one obtains in the same manner as for the x-direction a position in the y-direction in mixed base from which it is possible to directly determine the y-coordinate.

With the above method it is possible to code 4×4×2=32 positions in x-direction. Each such position corresponds to three differences, which gives 3×32=96 positions. Moreover, it is possible to code 5×5×5×2=250 positions in y-direction. Each such position corresponds to 4 rows, which gives 4×250=1000 positions. Altogether it is thus possible to code 96000 positions. Since the x-coding is based on differences, it is, however, possible to select in which position the first number series begins. If one takes into consideration that this first number series can begin in seven different positions, it is possible to code 7×96000=672000 positions. The starting position of the first number series in the first column can be calculated when the x-coordinate has been determined. The above-mentioned seven different starting positions for the first series may code different sheets of paper or writing surfaces on a product.

With a view to further illustrating the function of the position-coding pattern, here follows a specific example which is based on the described embodiment of the position code.

Figure 6:
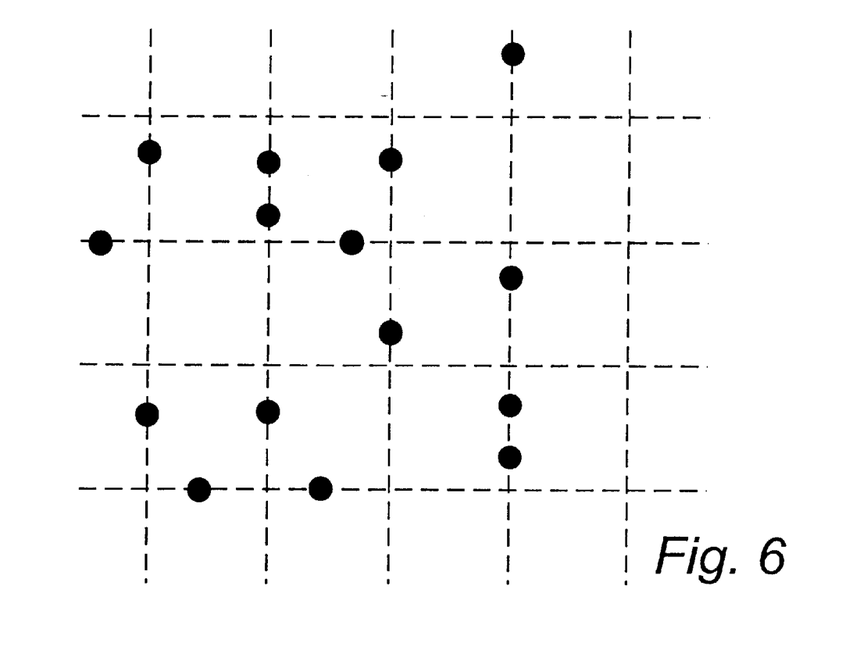
FIG. 6 shows schematically an example of 4×4 symbols that are used to code a position.

FIG. 6 shows an example of an image with 4×4 symbols which are read by a device for position determination.

These 4×4 symbols have the following values:

4 4 4 2
3 2 3 4
4 4 2 4
1 3 2 4

These values represent the following binary x- and y-code:

| x-code | y-code: |
|---|---|
| 0 0 0 0 | 0 0 0 1 |
| 1 0 1 0 | 0 1 0 0 |
| 0 0 0 0 | 0 0 1 0 |
| 1 1 0 0 | 1 0 1 0 |

The vertical x-sequences code the following positions in the number series: 2 0 4 6. The differences between the columns will be −2 4 2, which modulo 7 gives: 5 4 2, which in mixed base codes position (5−3)×8+(4−3)×2+(2−1)=16+2+1=19. Since the first coded x-position is position 0, the difference which is in the range 1–2 and which is to be seen in the 4×4 symbols is the twentieth such difference. Since furthermore there are a total of three columns for each such difference and there is a starting column, the vertical sequence furthest to the right in the 4×4 x-code belongs to the 61st column in the x-code (3×20+1=61) and the one furthest to the left belongs to the 58th.

The horizontal y-sequences code the positions 0 4 1 3 in the number series. Since these series begin in the 58th column, the starting position of the rows are these numbers minus 57 modulo 7, which yields the starting positions 6 3

0 2. Translated into digits in the mixed base, this will be 6–2, 3–2, 0–0, 2–2=4 1 0 0 where the third digit is the least significant digit in the number at issue. The fourth digit is then the most significant digit in the next number. In this case, it must be the same as in the number at issue. (An exceptional case is when the number at issue consists of the highest possible digits in all positions. Then one knows that the beginning of the next number is one greater than the beginning of the number at issue.)

The position of the four-digit number will then in the mixed base be 0×50+4×10+1×2+0×1=42.

The third row in the y-code thus is the 43rd which has the starting position 0 or 1, and since there are four rows in all on each such row, the third row is number 43×4=172.

Thus, in this example, the position of the uppermost left corner for the 4×4 symbol group is (58,170).

Since the x-sequences in the 4×4 group begin on row 170, the x-columns of the entire pattern begin in the positions of the number series ((2 0 4 6)–169) modulo 7=1 6 3 5. Between the last starting position (5) and the first starting position, the numbers 0–19 are coded in the mixed base, and by adding up the representations of the numbers 0–19 in the mixed base, one obtains the total difference between these columns. A naive algorithm to do so is to generate these twenty numbers and directly add up their digits. The resulting sum is called s. The sheet of paper or writing surface will then be given by (5–s)modulo7.

In the example above, an embodiment has been described, in which each position is coded with 4×4 symbols and a number series with 7 bits is used. Of course, this is but an example. Positions can be coded with a larger or smaller number of symbols. The number of symbols need not be the same in both directions. The number series can be of different length and need not be binary, but may be based on another base. Different number series can be used for coding in x-direction and coding in y-direction. The symbols can have different numbers of values. As is evident from that stated above, a coding with 6×6 symbols is presently preferred, each symbol being capable of assuming four values. A person skilled in the art can easily generalize the examples above to relate to such coding.

In the example above, the marking is a dot but may, of course, have a different appearance. For example, it may consist of a dash or some other indication which begins in the virtual raster point and extends therefrom to a predetermined position.

In the example above, the symbols within a square partial surface are used for coding a position. The partial surface may have a different form, such as hexagonal. The symbols need not be arranged in rows and columns at an angle of 90° to each other but can also be arranged in some other manner.

For the position code to be detected, the virtual raster must be determined. This can be carried out by studying the distance between different markings. The shortest distance between two markings must derive from two neighboring symbols having the value 1 and 3 so that the markings are located on the same raster line between two raster points. When such a pair of markings has been detected, the associated raster points can be determined with knowledge of the distance between the raster points and the displacement of the markings from the raster points. When two raster points have once been located, additional raster points can be determined by means of measured distances to other markings and with knowledge of the relative distance of the raster points.

Figure 7:
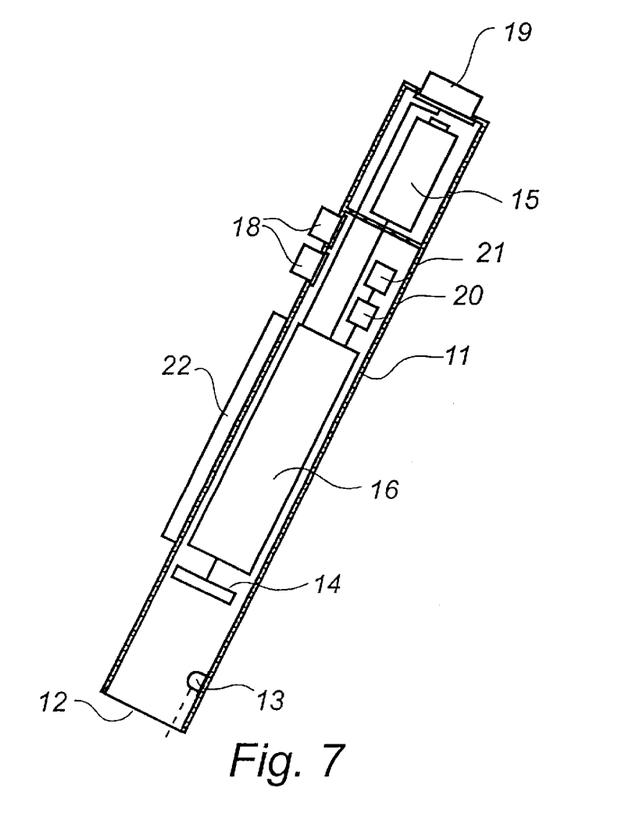
FIG. 7 shows a digital pen which can be included in an arrangement according to the invention.

An embodiment of a digital pen for making a handwritten entry in a calendar is schematically shown in FIG. 7. The pen comprises a casing 11 having approximately the shape of a pen. In one short side of the casing there is an opening 12. The short side is intended to abut against or be placed a short distance from the calendar page on which the entry is to be made.

The casing contains essentially an optics part, an electronic circuitry part, and a power supply.

The optics part comprises at least one IR light emitting diode 13 for illuminating the surface which is to be imaged and a light-sensitive area sensor 14, such as a CCD or CMOS sensor, for recording a two-dimensional image. The device may also comprise a lens system.

The power supply to the device is obtained from a battery 15 which is mounted in a separate compartment in the casing. The electronic circuitry part comprises image processing means 16 for determining a position and/or a time on the basis of the image recorded and more specifically a processor which is programmed to read images from the sensor and to carry out position and/or time determination on the basis of these images.

The digital pen also comprises a pen point 17, with the aid of which is possible to write ordinary pigment-based writing on a writing surface in the calendar. The pen point 17 is extendable and retractable so that the user can control whether or not it is to be used.

Moreover, the digital pen comprises buttons 18 by means of which the user activates and controls the device. It also comprises a transceiver 19 for wireless transfer of information to and from the device. The transfer can be carried out using IR or short-range radio link, preferably according to the Bluetooth standard.

The digital pen also comprises a real time clock 20 and a beeper 21 for providing an alarm. It can also comprise a display 22 for showing recorded calendar information.

The beeper can also be used to signal when the pen detects coordinates representing a function or a command so that that the user knows that the function has been detected. Alternatively, this signal can be given as a light signal.

The digital pen can alternatively be divided into different physical casings, a first casing containing the area sensor and other components required for capturing images of the code and for transferring them to a processor and other components which are located in a second casing and which carry out position and/or time determination on the basis of the recorded image or images. In a preferred embodiment, the above absolute position-coding pattern is used, which is imaged by the sensor. The processor processes the images captured by the sensor at least to such an extent that the coordinates corresponding to the images can be determined. Thus, the recorded information can be forwarded in a more compact format than if the captured images were transferred directly.

When the user makes an entry on the calendar page 1, which is provided with the above position code, he writes in the ordinary way with the pen point 17 on the page, the digital pen continuously recording images of that part of the code which is within the visual field of the pen. Further, the pen determines the position to which each image corresponds. The positions recorded while the user makes an entry with the pen point are stored in a memory in the pen. They represent both a digital description of the handwritten entry and information about the location in the calendar where the entry was made and, consequently, also the time period or the writing area which the entry is associated with. The calendar information determined in this manner can be transferred to an electronic calendar in, for example, the user's workplace computer or be stored in an electronic calendar directly in the pen.

Figure 8:
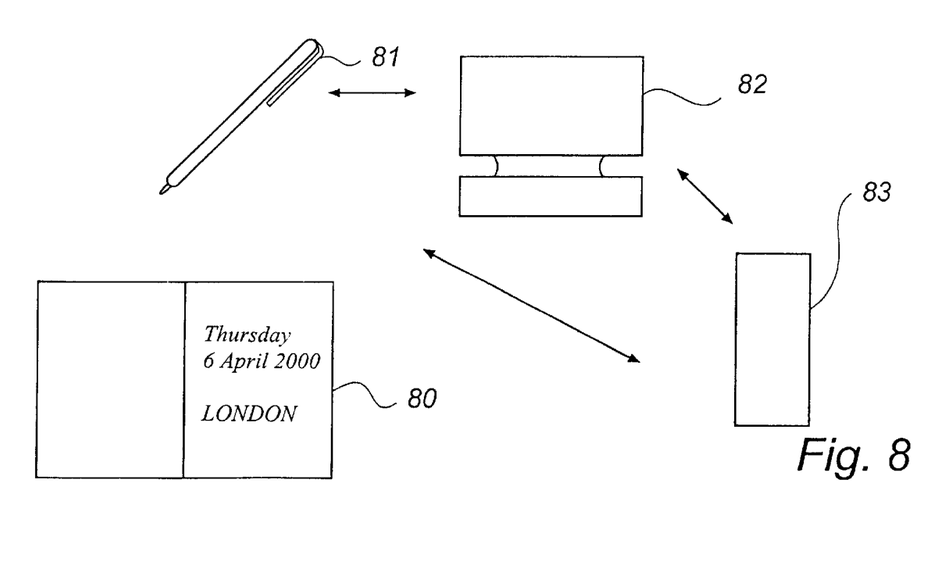
FIG. 8 shows an example of an arrangement according to the invention.

FIG. 8 shows schematically a system for processing calendar information. The Figure intends to illustrate various alternatives for processing information that is recorded from the calendar.

The system comprises a calendar 80 of the type described above, a digital pen 81 which can be designed in the manner described above with reference to FIG. 7, a computer 82, with which the digital pen can communicate and which contains a digital calendar, and a server 83 which can be reached via the Internet.

Now assume that a user makes an entry with the digital pen 81 in the calendar 80. The entry is recorded digitally by the pen and stored as a coordinate sequence in a memory in the pen. The time when the entry is made is recorded and stored together with the coordinate sequence as a time stamp.

According to a first variant, the entry, in the form of the coordinate sequence, and the time stamp are transferred to the computer as soon as the digital pen gets in contact with the computer. The computer 82 has a program which recognizes the coordinate sequence as calendar information. The program has stored information which makes it possible to determine, on the basis of the coordinates, to which unique time period the entry is related. The entry is stored as an image in the digital calendar in an area or associated with an area which corresponds to the predetermined unique time period. The digital calendar will also contain an image of the entry that was made in the physical calendar 80. The time stamp is stored together with the entry.

The program in the computer 82 may contain an OCR module. If the entry in the physical calendar has been written in block letters, these can be identified by means of the OCR module and stored in character-coded format so that the entries will be searchable.

According to another variant the digital pen 81 itself contains the software described above as being present in the computer. The digital pen can then transfer the entry in graphic or character-coded format together with an indication of the unique time period to which the entry is related. However, this variant is less preferred today since it requires more processor capacity in the digital pen which thus will be more expensive than in the preceding variant.

According to one more variant, the digital pen is adapted to transfer all calendar entries to the server 83 on the Internet. This server can then perform the functions which in the first variant were performed in the computer. The entry can in this case be stored in a digital web-based calendar. Alternatively the server can transfer the entry to the user's computer 82 with instructions about where in its digital calendar the entry is to be stored.

The information about the time periods to which different coordinates in the calendar are related can thus be available in the digital pen 81, in the calendar user's computer 82 or in a server 83 on the Internet. The information can also be distributed in different ways between these units.

Figure 9:
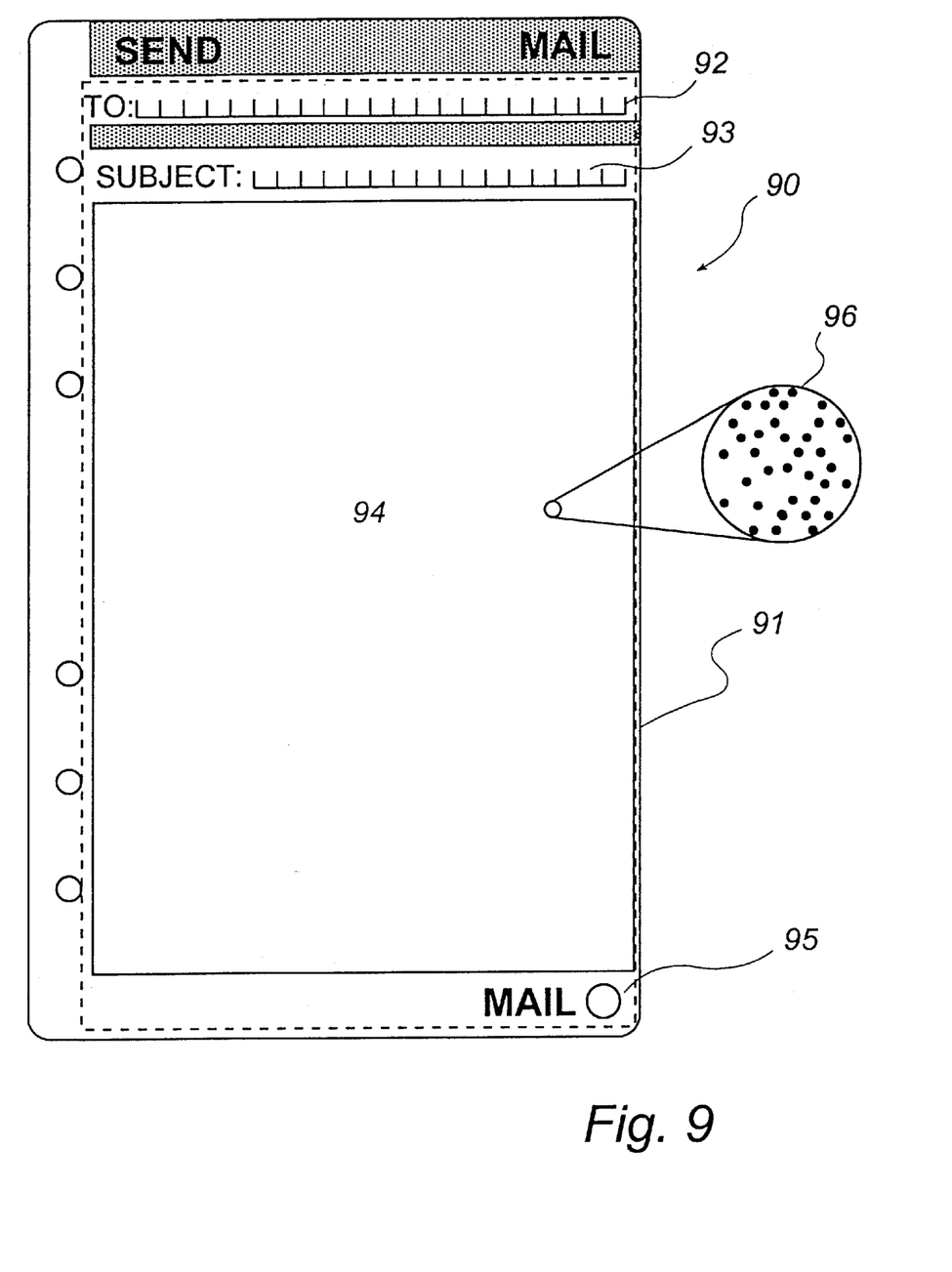
FIG. 9 shows an example of a calendar page with a writing area and mail function.

FIG. 9 shows an example of a calendar page 90 which may be included in a calendar according to the invention.

The calendar page makes it possible for the user to send an e-mail. The page comprises a writing area 91 which is divided into different fields. A first field 92 is used to indicate an addressee, a second field 93 to indicate a subject of the mail and a third field 94 for the actual mail message. The information in the first and the second field 92, 93 is written in block letters to enable character recognition and conversion to character-coded format so that the contents of these fields can be interpreted by a computer. The information in the third field can be arbitrary graphic information which is written or drawn by hand. The calendar page also has a function field 95 which defines the command that the mail is to be sent. The calendar page is, across the entire writing area 91, provided with a subset of the above absolute position-coding pattern, which is indicated schematically with the enlarged area 96. This subset codes coordinates for points within an area on the imaginary surface, which area is dedicated to mail information. Different subareas of the coordinate area can be intended for address information, subject information and message information. The function field 95 can be provided with a special subset of the absolute position-coding pattern, said subset coding the command "send".

When the calendar user wants to send a mail, he fills in address information, subject information and message information with his digital pen which records the information in the form of coordinate sequences that are stored in the buffer memory of the pen. Then the user makes a marking in the function field to indicate that the mail is to be sent. The pen records the coordinates which correspond to the marking in the function field. The pen can then process the mail information in various ways. According to a variant, the pen itself has software to interpret the address information and generate a mail which is sent via a mobile phone or a computer via the Internet to the addressee. In another variant, the different coordinate sequences are sent to the computer which has software to recognize that the received information is a mail and software to interpret the address information and generate a mail which is sent to the address as stated. As a third alternative, the pen can be programmed to send the coordinate sequences to a server on the Internet which performs the above-described functions.

The calendar can advantageously contain a number of different pages of a similar type which in a corresponding manner permit the sending of, for example, fax and SMS and which contain address field and message field for graphic, i.e. handwritten, information.

The above examples may be varied in many ways. According to one example, the handwritten entry can be recorded with a digital pen which detects the movement of the pen, such as with an accelerometer, and the determination of the time period can be carried out by imaging a time code.

In an alternative way of electronically recording the handwritten entry, the digital pen can be adapted to capture a plurality of images with partly overlapping contents while making the handwritten entry, to determine how the pen is moved between the capturing of each image by means of the partly overlapping contents so as to provide an electronic recording of the handwritten entry. A drawback of this method of performing the electronic recording compared with the recording of the positions is that there is no information about where in a writing area the entry is made or how characters entered with an intermediate raising of the pen are related to each other.

According to a further alternative for electronic recording of the handwritten entry, the digital pen can be adapted to capture a plurality of images while making the handwritten entry, said images being put together to a composite image of the handwritten entry. In this case, a direct electronic imaging of the entry is thus made. However, this embodiment requires a larger amount of memory than the two preceding ones.

The digitized handwritten entry can be stored by means of a bitmap, i.e. an image, or with vectors or coordinates describing the movement of the pen. It is also possible, particularly if the entry is written in block letters and thus not with the letters joined, to use a character recognition program, a so-called ICR program (Intelligent Character Recognition), in the device and by means of this interpret the written characters and store them in character-coded format.

The digital pen can also be provided with means for warning a user about a coming activity on the basis of the electronically recorded handwritten entry and the predetermined unique time period. For instance, an alarm can be set when a user makes an entry at one point of time and the alarm is activated when a real time clock in the pen reaches this point of time. Alternatively the pen can be designed so that the user must perform a special operation to set the alarm, e.g. send a point of time by phone to the physical calendar. By this function, the user will automatically obtain an additional reminder, which is not achieved with a paper-based calendar of prior-art type.

What I claim and desire to secure by letters patent is:

1. A calendar, comprising:
   a plurality of pages, which have a plurality of calendar areas, each of which identifies a unique time period and is adapted to receive a handwritten entry for that time period;
   an electronically readable code provided on each of said calendar areas, said electronically readable code allowing the electronic recording of the handwritten entry made in the calendar area and its association with the time period specified by the calendar area.

2. A calendar according to claim 1, wherein the code is an absolute position-coding pattern which extends across the calendar areas and codes coordinates for absolute positions so that a handwritten entry which is made in a first of said calendar areas can be recorded digitally in the form of a coordinate sequence by detecting the absolute position-coding pattern and the time period which is identified by the first calendar area can be determined on the basis of the coordinates in the coordinate sequence.

3. A calendar according to claim 2, wherein the absolute position-coding pattern constitutes a first subset of a larger absolute position-coding pattern, said subset coding coordinates for points within a first coordinate area on an imaginary surface, which comprises all points which the larger absolute position-coding pattern has the capacity of coding, said first coordinate area being dedicated to calendar information.

4. A calendar according to claim 2 or 3, wherein at least one page is provided with said absolute position-coding pattern and indications which specify said unique time periods, the absolute position-coding pattern and said indications being superimposed on each other.

5. A calendar according to claims 1, wherein at least one calendar area is associated with a function field which defines a command that is to be carried out with respect to a handwritten entry which is made in this calendar area.

6. A calendar according to claim 5, wherein the function field is provided with an absolute position-coding pattern.

7. A calendar according to claim 6, wherein the absolute position-coding pattern of the function field is a subset of a larger absolute position-coding pattern, said subset coding coordinates for points in a coordinate area on an imaginary surface, which comprises all points which the larger absolute position-coding pattern has the capacity of coding, the coordinate area being dedicated to the command.

8. A calendar according to claim 1 further comprising at least one writing area, which does not identify a time period and which is adapted to receive handwritten entries, said writing area being provided with an absolute position-coding pattern.

9. A calendar according to claim 8, wherein the absolute position-coding pattern is a subset of a larger absolute position-coding pattern, said subset coding coordinates for points within a coordinate area on an imaginary surface, which comprises all points which the larger absolute position-coding pattern has the capacity of coding.

10. A calendar according to claim 8, wherein the writing area is associated with a function field which defines a command that is to be carried out with respect to a handwritten entry made in the writing area.

11. A calendar according to claim 10, wherein said command is one of storing the handwritten entry, sending a mail containing the handwritten entry, sending an SMS containing the handwritten entry, and sending a fax containing the handwritten entry.

12. A calendar according to claims 6 or 8, wherein the absolute position-coding pattern is based on a first string of symbols which contains a first predetermined number of symbols and has the characteristic that, it a second predetermined number of symbols is taken from the first string of symbols, the location of these symbols in the first string of symbols is unambiguously determined, the first string of symbols being used to determine the position in a first dimension on the calendar page; and on a second string of symbols having the same characteristic as the first string of symbols, the second string of symbols being used to determine the position in a second dimension on the calendar page.

13. A system for electronic storage of a handwritten entry made in a calendar, which comprises a plurality of pages with a plurality of calendar areas, provided with a position code associated with each of said calendar areas, each of the calendar areas identifying a unique time period and adapted to receive the handwritten entry, said system comprising:
   a digital pen adapted to record a handwritten entry on the calendar and electronically record the handwritten entry by sensing the position code, for entry into a computer device,
   a computer device receiving information of the handwritten entry including position code information and identifying the unique time period associated with a calendar area from the position code information, thereby enabling the creation of an electronic back-up of the calendar.

14. A system according to claim 13, wherein the digital pen is provided with a sensor for capturing images for recording the handwritten entry and a pen point for making the entry in the physical calendar.

15. A system according to claim 13, wherein the digital pen further comprises a processor for processing the images, said processor being adapted to detect the position code in the form of an absolute position-coding pattern in each of said images and to convert said absolute position-coding patterns in each image to coordinates for a point, the handwritten entry being recorded as a coordinate sequence.

16. A system according to claim 15, wherein the system further comprises means for determining the unique time period on the basis of the coordinates in said coordinate sequence.

17. A system according to any one of claims 13–16, wherein the computer device stores the handwritten entry in a digital calendar, the storing occurring associated with an indication of time which corresponds to said unique time period which identifies the calendar area in which the handwritten entry is made.

18. A system according to claim 13, wherein the system associates a time stamp with each handwritten entry.

19. A system according claim 15, wherein the system identifies predetermined coordinates as defining a predetermined command and initiates a measure with regard to an electronically recorded handwritten entry in response to the detection of said command.

20. A system according to claim 13, wherein the digital pen has means for wireless transfer of the handwritten entry to the computer device.

21. A system according to claim 13, further comprising means for warning a user about a coming event on the basis of the electronically registered handwritten entry and the predetermined time period.

22. A method for processing calendar information comprising the steps of:
   electronically recording a handwritten entry which is made in a calendar area in a physical calendar, the recording being made in the form of a coordinate sequence;
   determining a unique time period to which the calendar area corresponds on the basis of coordinates in said coordinate sequence, and
   storing the electronically recorded handwritten entry in a digital calendar in connection with an indication of time corresponding to the unique time period.

23. A method according to claim 22, wherein the step of recording the handwritten entry comprises capturing images of an absolute position-coding pattern on which said handwritten entry is made, and detecting coordinates for absolute positions on the basis of the images of the absolute position-coding pattern.

24. A calendar page comprising:
   a user writable media having calendar information imprinted thereon and having calendar areas associated with times for receiving user writing;
   a position coding pattern provided on the user writable media, the position coding pattern enabling electronic recording of a handwritten entry which is made on the calendar page, the absolute position coding pattern also associating the handwritten entry with the calendar area on which it is written.

25. A calendar page according to claim 24, wherein the coding pattern is an absolute position-coding pattern.

26. A calendar page according to claim 25, wherein the absolute position-coding pattern is adapted to enable one of the functions of storing the handwritten entry in an external unit, sending a mail containing the handwritten entry, sending an SMS containing the handwritten entry, and sending a fax containing the handwritten entry.

27. A system for recording information into a physical calendar provided with a plurality of temporal areas coded with a position code, each of which identifies a unique time period and is adapted to receive a handwritten entry for that time period comprising:
   an electronic pen for writing in said physical calendar and for electronically reading the writing imparted to the physical calendar by reading said position code and developing position code information defining the writing and its associated time period; and
   a computer system receiving said position code information and electronically recording the writing with its associated unique time period in a computer calendar.

28. The system of claim 27 wherein said calendar comprises a plurality of pages.

29. The system of claim 27, wherein the electronic pen is a digital pen provided with a sensor for capturing images for recording the handwritten entry and a pen point for writing in the physical calendar.

30. The system of claim 29 wherein the digital pen includes a processor for processing the position code to produce an image of the writing on said calendar.

31. The system of claim 29 wherein said position code is an absolute position-coding pattern, said digital pen converting the absolute pattern into a coordinate sequence identifying the path of the pen point when making the handwritten entry.

32. The system of claim 27, wherein the system further comprises means for determining the unique time period on the basis of the coordinates in said coordinate sequence.

33. The system of claim 27 wherein the computer system stores the handwritten entry in a digital calendar, the storing occurring associated with an indication of time which corresponds to said unique time period which identifies the calendar area in which the handwritten entry is made.

34. The system of claim 33, wherein the system associates a time stamp with each handwritten entry.

35. The system of claim 27, wherein the system identifies predetermined coordinates as defining a predetermined command and initiates a measure with regard to an electronically recorded handwritten entry in response to the detection of said command.

36. The system of claim 27, wherein the digital pen includes means for wireless transfer of the handwritten entry to the computer system.

37. The system of claim 27, further comprising means for warning a user about a coming event on the basis of electronically registered handwritten entry and the predetermined time period.

* * * * *